United States Patent
Levin et al.

(10) Patent No.: US 12,277,107 B1
(45) Date of Patent: Apr. 15, 2025

(54) DETECTION OF CHANGES IN STORAGE ARRAYS FOR DATABASES

(71) Applicant: Dell Products L.P., Round Rock, TX (US)

(72) Inventors: Elik Levin, Modi'in (IL); Arieh Don, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/647,389

(22) Filed: Apr. 26, 2024

(51) Int. Cl.
*G06F 7/00* (2006.01)
*G06F 16/22* (2019.01)
*G06F 16/23* (2019.01)

(52) U.S. Cl.
CPC ...... *G06F 16/2365* (2019.01); *G06F 16/2237* (2019.01)

(58) Field of Classification Search
CPC .................. G06F 16/2365; G06F 16/2237
USPC .................................................. 707/600–899
See application file for complete search history.

(56) References Cited

U.S. PATENT DOCUMENTS

2014/0180915 A1* 6/2014 Montulli ............... G06Q 30/04
705/40

\* cited by examiner

*Primary Examiner* — Isaac M Woo
(74) *Attorney, Agent, or Firm* — WOMBLE BOND DICKINSON (US) LLP (57) ABSTRACT

Methods and systems for managing database data stored in a storage array and on behalf of a data processing system hosting a database application are disclosed. The database data may be managed by checking for changes in records of the database data. A record of the records may be checked for the changes by comparing a first checksum, hash, and/or cryptographic string from the record to a second first checksum, hash, and/or cryptographic string computed by a data processing system. If the first checksum matches the second checksum, then the record may be validated. Validating a record of the records by checking the changes in the records, rather than all the records, of the database data may permit computing resources to be available for use in other computer implemented services.

20 Claims, 8 Drawing Sheets

DETECTION OF CHANGES IN STORAGE ARRAYS FOR DATABASES

FIELD

Embodiments disclosed herein relate generally to managing database data stored in a storage array and on behalf of a data processing system hosting a database application. More particularly, embodiments disclosed herein relate to monitoring changes in the database data stored in the storage array.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing database data stored in a storage array and on behalf of a data processing system hosting a database application. The database data may be managed by monitoring for changes in the database data. The changes may be monitored by checking for the changes to the database data in the storage array between two snapshots of the changes within a period of time.

The checking for the changes may be performed by a data processing system. The data processing system may receive the changes from the storage array. For a portion of a change of the changes, the data processing system may read a first checksum, hash and/or cryptographic string in a record of the portion of the change. In addition, the data processing system may generate a second checksum, hash and/or cryptographic string.

The data processing system may compare the first checksum to the second checksum. If there is a match between the first checksum and the second checksum, then the portion of the change may be validated. Otherwise, if there is not the match, then the portion of the change may not be validated. The portion of the change may not be validated because the portion of the change may be the result of (i) errors in storage operations, (ii) malicious activity meant to disrupt storage operations, and/or (iii) failures in storage media.

By checking and validating the portion of the change of the changes, computing resources may be made available for other computer implemented services. Computing resources may be made available because the checking for the changes may require checking only a portion of records in a storage array and not in all of the records in the storage array.

In an embodiment, a method for managing interfaces for peripheral devices is disclosed. The method may include (i) identifying, by the data processing system, that a condition indicates that a check of the database data is to be performed; (ii) based on the condition being identified: (a) requesting, by the data processing and from the storage array, differential auxiliary data that lists changes made to the database during a period of time; (b) reading, by the data processing system and based on the differential auxiliary data, a portion of records from the database data; (c) attempting to validate integrity of the portion of the records; (d) in a first instance of the attempting where the integrity of at least one record of the portion of the records is not validated: (1) remediating the database data stored in the storage array to obtain updated database data; and (2) attempting, using the updated database data, to perform a process on which the condition is based; (e) in a second instance of the attempting where the integrity of all records of the portion of the records is validated: (1) concluding that the integrity of the database data stored in the storage array is intact; and (2) performing the process using the database data in the storage array.

The differential auxiliary data may be based on two snapshots of the database data taken at different points in time and that delineate the period of time.

The condition may be an occurrence of a scheduled point in time for generation of a new backup of the database data.

The period of the time may be an interval of time between when a most recent backup for the database data was created and the scheduled point in time.

The listed changes may include identifiers of files that have been modified during the period of the time from a perspective of the storage array.

Each record of the portion of the records may include at least portion of one of the files.

Attempting to validate the integrity of the portion of the records may include, for a record of the portion of the records: (i) obtaining a first checksum from integrity data of the record; (ii) obtaining a second checksum using a payload of the record and a checksum algorithm; and (iii) comparing the first checksum to the second checksum to ascertain whether a match has been made.

A record of the records may include (i) a payload comprising application data for the database application; and (ii) integrity data usable to validate integrity of the payload.

Remediating the database data stored in the storage array to obtain the updated database data may include reverting at least a record of the portion of the records to a previous state.

Attempting, using the updated database data, to perform a process on which the condition is based, may include (i) generating, using a first snapshot of the database data and a second snapshot of the database data in a previous state, changes to the database data that have been made during the period of time; and (ii) using the changes to the database to store data usable to perform restorations for the database data.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Figure 1A:
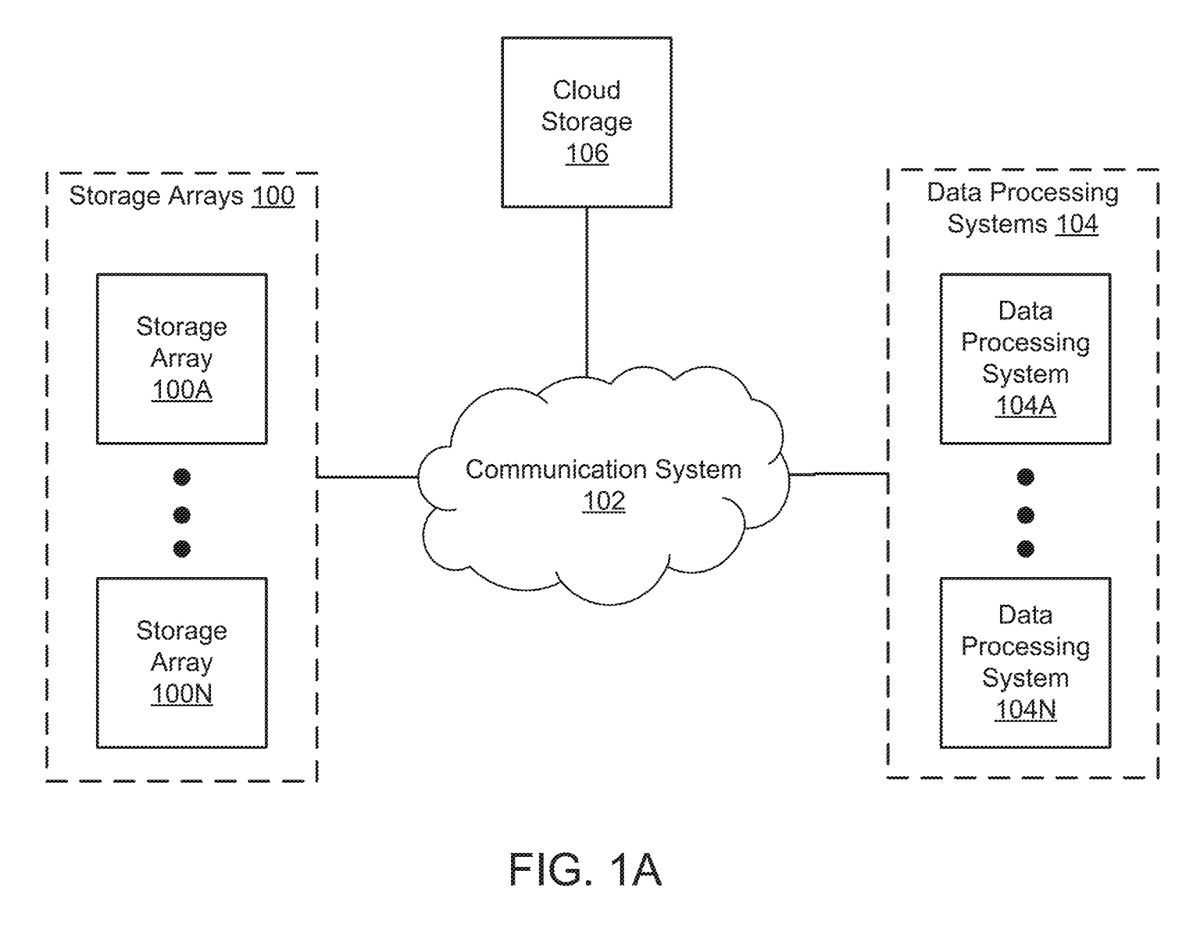
FIGS. 1A-1C show diagrams illustrating a system in accordance with an embodiment.

Turning to FIG. 1A, a system in accordance with an embodiment is shown. The system may provide any number and types of computer implemented services (e.g., to user of the system and/or devices operably connected to the system). The computer implemented services may include, for example, data storage service, instant messaging services, etc.

To provide the computer implemented services, data may be generated and stored in databases for future use. The databases may be stored in one or more storage arrays and/or a cloud storage service. The data may be accessed from the one or more storage arrays and/or the cloud storage service using one or more data processing systems.

To provide the computer implemented services, data previously stored in the databases may be accessed. If the data in the databases cannot be accessed, then the computer implemented services may not be able to be provided in part or entirely.

In general, embodiments disclosed herein relate to systems and methods for managing database data stored in a storage array and on behalf of a data processing system hosting a database application. The database data may be managed by proactively verifying integrity of the database data. By verifying the integrity of the database data, the likelihood of being able to access the data in the future may be improved.

The integrity of the database data may be verified by looking for differences between data believed to be stored in storage arrays and the actual database data that is stored.

To identify such differences, changes to the data from the perspective of the device (e.g., storage arrays) in which the database data may be reported to database applications. If the changes from the perspective of the device storing the database data differ from changes believed to be made by the database application itself, then the integrity of the database data may be presumed to be compromised.

If the integrity of the database data is presumed to be compromised, then a verification process may be performed. The extent of the verification process may be limited to only those portions of the database data that have been changed since the integrity of the database data was previously verified (e.g., which may occur during backup procedures).

By limiting the extent of the verification process, the data processing system may have more computing resources available. With more computing resources available, the data processing system may be able to dedicate additional computer resources to provide desired computer implemented services rather than expending the computing resources for data storage verification.

To provide the above noted functionality, the system may include storage arrays 100, data processing systems 104, and cloud storage 106. Each of these components is discussed below.

Data processing systems 104 may include any number of data processing system 104A-104N. Data processing system 104A-104N may include database applications that generate database data. The database data may need to be backed up in storage arrays 104 and/or cloud storage 106.

To back up the database data, a database application on data processing system 104A-104N may initiate generation of auxiliary data. To initiate generation of the auxiliary data, the database data may be checked by the database application to see if the database data is valid.

To see if database data is valid, an algorithm may be used to generate a checksum, hash, and/or cryptographic string, which may be compared with a stored checksum, hash, or cryptographic string by the database data with a timestamp. If a match is found between the generated checksum, hash, or cryptographic string and the stored checksum, hash, and/or cryptographic string, then the database data may be determined to be valid. If the database data is determined to be valid, then the auxiliary data may be generated. If the auxiliary data is generated, then the auxiliary data may be stored in storage arrays 104 and/or cloud storage 106.

While described with respect to an example algorithm that utilizes checksums or other types of validation data, it will be appreciated that records managed by the database application may be checked using other types of algorithms without departing from embodiments disclosed herein.

Storage arrays 100 may serve as a primary storage for database data utilized by database applications hosted by data processing systems 104.

Figure 1B:
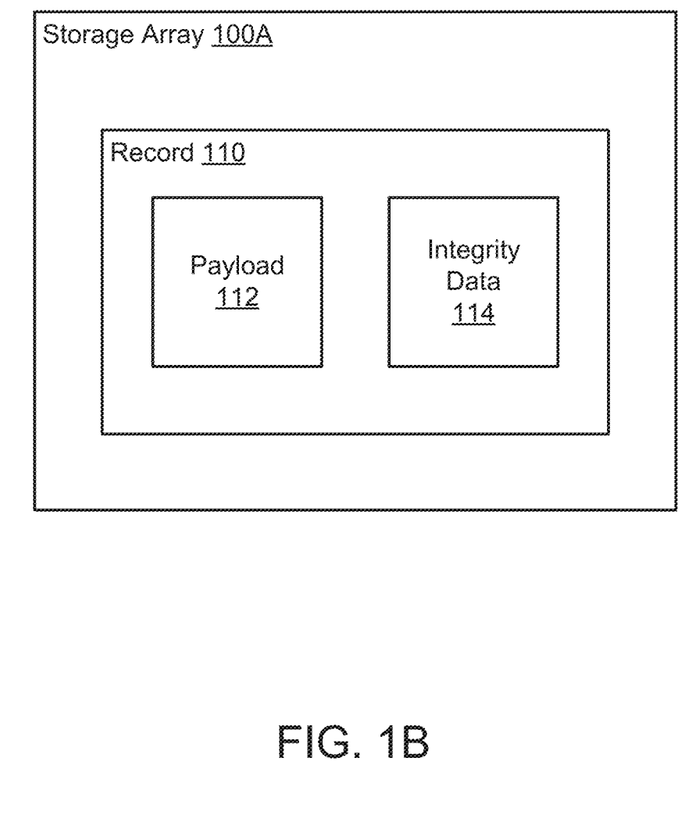

Turning to FIG. 1B, a diagram of an example of storage array 100A-100N in accordance with an embodiment is shown. Storage array 100A may store database data from the database used by data processing systems 104.

However, if a data processing system (e.g., 104) is compromised, then the integrity of the database data may be compromised. For example, malicious writes/deletes/inserts may be made which may cause the content of the data stored in storage arrays 100 to differ from that which the database application hosted by data processing systems 104 believes to be present. Consequently, if backups or other operations are performed, these malicious changes to the data may be propagated to long term storage for backups.

For example, the data stored in storage array 100A may include any number of records for the database application. Each record may include a payload (e.g., 112) and integrity data (e.g., 114). The payload may include data stored by the database application.

Integrity data 114 may include metadata that is usable to confirm the integrity of the payload of the record. The metadata may include, for example, a checksum, hash, and/or cryptographic string that may be generated by the database application.

However, once stored in storage array 100A, the payloads of records 110 may be maliciously (or through errors)

changed. To address these undesired changes, the integrity data of each record may be used to verify the integrity of the payload of each record.

Figure 2A:
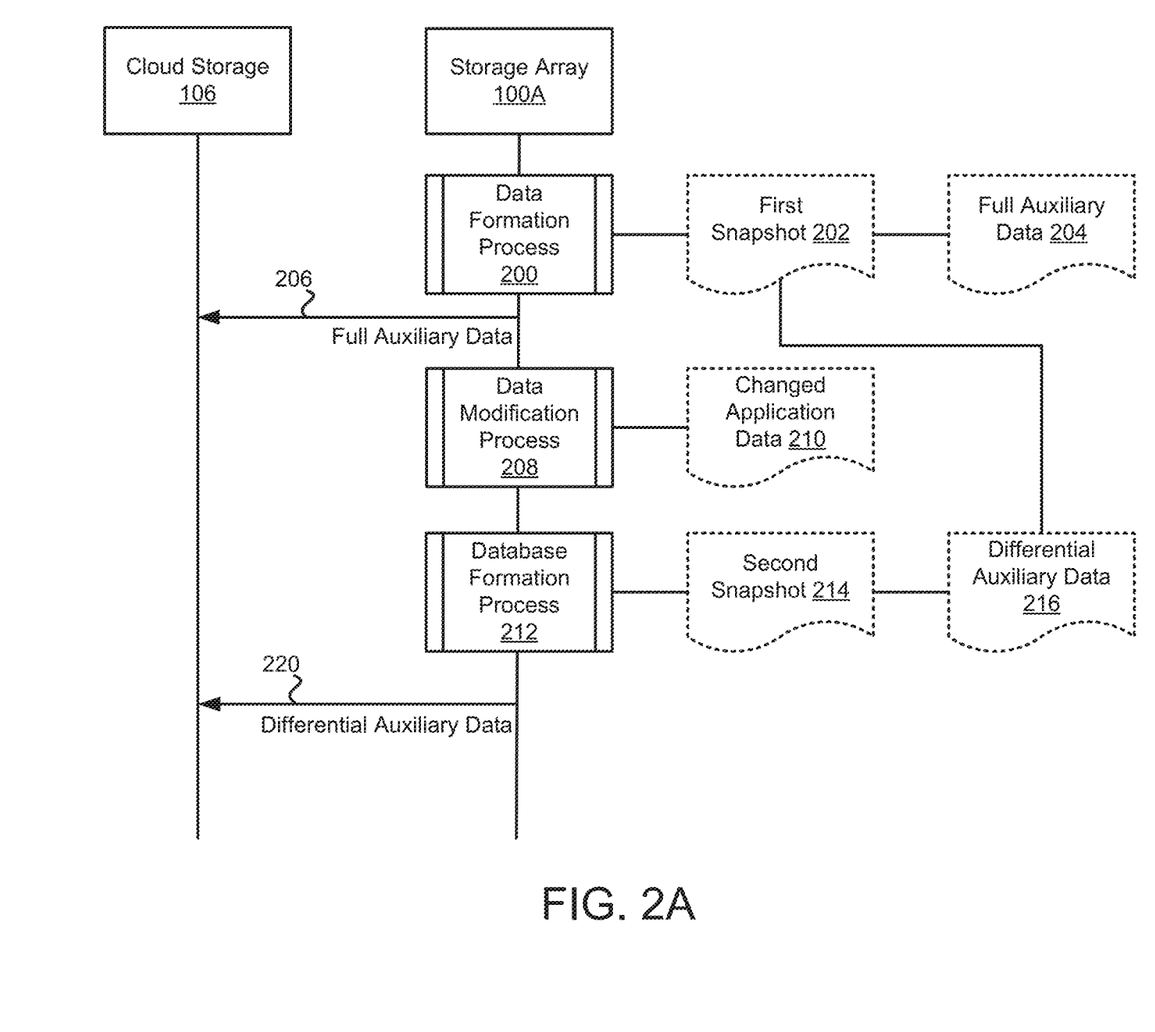
FIGS. 2A-2B show data flow diagrams illustrating operation of a system in accordance with an embodiment.
Figure 2B:
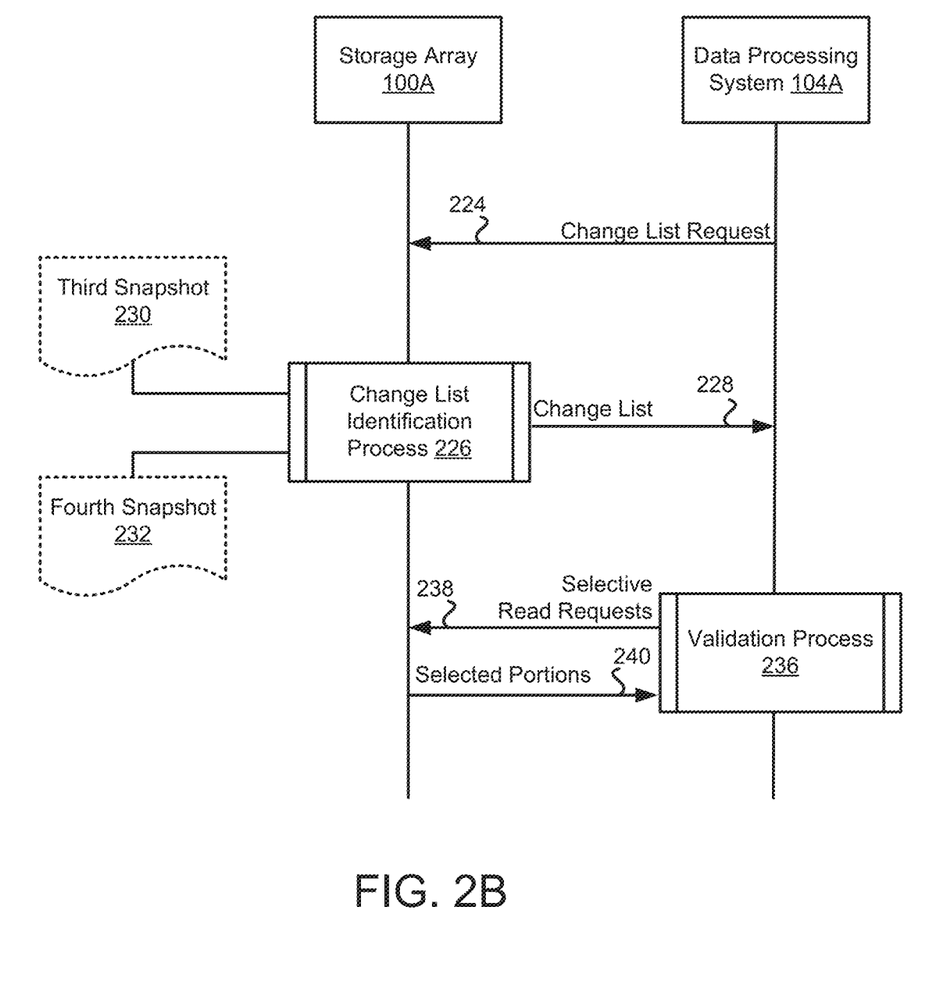

However, the integrity verification process using the integrity data may be computationally expensive. To reduce the computation expense, the integrity verification process may be limited to only those records that have been changed (e.g., as reported by storage array 100A). Consequently, the computational cost for record integrity verification may be reduced. Refer to FIGS. 2A-2B for additional details regarding record integrity verification.

Figure 1C:
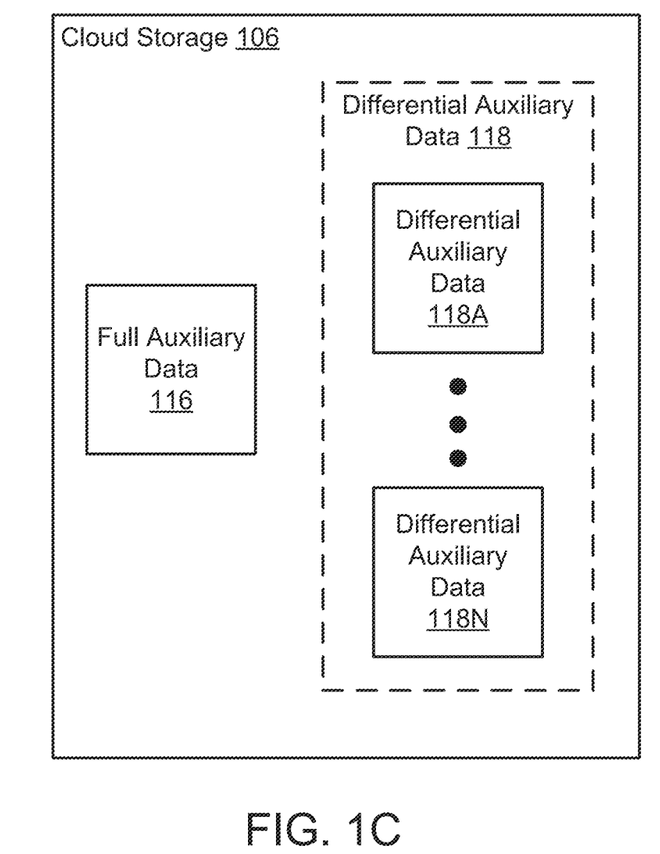

Returning to the discussion of FIG. 1A, a cloud storage (e.g., 106) may be used to backup copies of data stored in storage arrays 100. Turning to FIG. 1C, a diagram of an example of cloud storage 106 in accordance with an embodiment is shown.

To back up the data stored in storage arrays 100, cloud storage 106 may store full auxiliary data 116 and/or differential auxiliary data 118. Full auxiliary data 116 may be a representation of the data stored in storage arrays 100 at a point in time.

Differential auxiliary data 118 may include any quantity of differential auxiliary data (e.g., 118A-118N). Each portion of differential auxiliary data 118A-118N may indicate changes made to the data stored in storage arrays 100 over a corresponding period of time. For example, a portion of differential auxiliary data may include a difference between two snapshots of the data stored in storage arrays 100. The snapshots may be representations of the data stored in storage arrays 100 at two different points in time.

The aforementioned auxiliary data (e.g., 116-118) may be usable to reconstitute copies of the data stored in storage arrays 100 at different points in time (e.g., corresponding to the snapshots). However, if the content of any of the auxiliary data is based on maliciously modified data hosted by the storage arrays, then the auxiliary data may not be able to reconstitute the data that is believed to be stored in the storage array by the database application. Thus, permanent data loss may occur if such malicious changes are not excluded from the auxiliary data.

Returning to the discussion of FIG. 1A, thus cloud storage 106 and storage arrays 100 may cooperatively store data used to provide various computer implemented services. For example, the data stored in cloud storage 106 may be usable to restore the data stored in the storage arrays.

While providing their functionality, any of storage arrays 100, data processing systems 104, and cloud storage 106 may perform all, or a portion, of the flows and methods shown in FIGS. 2A-3B.

Any of (and/or components thereof) storage arrays 100, data processing systems 104, and cloud storage 106 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1A may be operably connected to each other (and/or components not illustrated) with communication system 102. In an embodiment, communication system 102 includes one or more networks that facilitate communication between any number of components. The networks may include wired networks and/or wireless networks (e.g., and/or the Internet). The networks may operate in accordance with any number and types of communication protocols (e.g., such as the Internet protocol).

While illustrated in FIG. 1A as including a limited number of specific components, a system in accordance with an embodiment may include fewer, additional, and/or different components than those components illustrated therein.

To further clarify embodiments disclosed herein, interactions diagrams in accordance with an embodiment are shown in FIGS. 2A-2B. These interactions diagrams may illustrate how data may be obtained and used within the system of FIG. 2A-2B.

In the interaction diagrams, processes performed by and interactions between components of a system in accordance with an embodiment are shown. In the diagrams, components of the system are illustrated using a first set of shapes (e.g., 106, 100A, etc.), located towards the top of each figure. Lines descend from these shapes. Processes performed by the components of the system are illustrated using a second set of shapes (e.g., 200, 208, etc.) superimposed over these lines. Interactions (e.g., communication, data transmissions, etc.) between the components of the system are illustrated using a third set of shapes (e.g., 206, 220, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur. A fourth set of shapes (e.g., 202, 204) may represent data structures which may be generated in and/or used in processes. Lines interconnecting these shapes may illustrated relationships between the data structures (e.g., in which processes the data structures are used, on which data structures others are based, etc.).

Generally, the processes and interactions are temporally ordered in an example order, with time increasing from the top to the bottom of each page. For example, the interaction labeled as 206 may occur prior to the interaction labeled as 220. However, it will be appreciated that the processes and interactions may be performed in different orders, any may be omitted, and other processes or interactions may be performed without departing from embodiments disclosed herein.

Turning to FIG. 2A, a first interaction diagram in accordance with an embodiment is shown. The first interaction diagram may illustrate processes and interactions that may occur during backing up of data to a cloud storage.

To backup data to the cloud storage, storage array 100A may perform data formation process 200. During data formation process 200, first snapshot 202 may be generated. First snapshot 202 may be used to obtain full auxiliary data 204 (e.g., a representation of the data stored in storage array 100A at a point in time).

Once obtained, at interaction 206, full auxiliary data 204 may be stored in cloud storage 106. To store full auxiliary data 204, full auxiliary data 204 may be transferred from storage array 100A to cloud storage 106. Full auxiliary data 204 may be transferred by sending full auxiliary data 204 from storage array 100A to cloud storage 106. While described with respect to cloud storage 106 as an example, it will be appreciated that the auxiliary data may be stored in other locations without departing from embodiments disclosed herein.

Once stored, the data stored in storage array 100A may change over time. For example, data modification process 208 may be performed. Data modification process 208 may represent activity of the database application changing data stored in storage array 100A. Consequently, cloud storage 106 may not include data usable to restore some of the data in storage array 100A. For example, during data modification process 208, changed application data 210 may be stored in various records in storage array 100A.

To facilitate restoration of this changed data, data formation process 212 may be performed. During data formation process 212, second snapshot 214 may be generated. Second snapshot 214 may represent the state of the data of storage array 100A at a second point in time (e.g., after first snapshot 202 was generated).

Using second snapshot 214 and first snapshot 202, differential auxiliary data 216 may be generated. Differential auxiliary data 216 may be generated by identifying differences between second snapshot 214 and first snapshot 202. The identified differences may be stored as differential auxiliary data 216.

At interaction 220, differential auxiliary data 216 may be stored in cloud storage 106. Consequently, the data stored in cloud storage 106 may be usable to restore the state of the data in storage array 100A to that of the first point in time associated with first snapshot 202 or the second point in time associated with second snapshot 214 (e.g., by applying the differences specified by differential auxiliary data 216 to full auxiliary data 204).

However, as discussed above, the aforementioned data may only be usable to restore the state of the data as stored on storage array 100A at the time the auxiliary data is generated. If the data stored in storage array 100A is different from that believed to be stored by a database application hosted by a data processing system, then the data that may be restored using the auxiliary data may not be able to return access to the data previously believed to be stored by the database application.

To reduce the likelihood of data loss occurring, the content of the data stored in storage array 100A may be efficiently validated prior to generation and storage of backups.

Turning to FIG. 2B, a second interaction diagram in accordance with an embodiment is shown. The second interaction diagram may illustrate processes and interactions that may occur during validation of integrity of the data stored in storage array 100A.

To validate the integrity of the data stored in storage array 100A, at interaction 224, a request for a change list may be sent by data processing system 104A. The change list may be list of changes to data maintained by storage array 100A for a database application hosted by data processing system 104A.

In response to receiving the change list request, storage array 100A may perform change list identification process 226. During change list identification process 226, storage array 100A may retrieve third snapshot 230 (e.g., a snapshot of the data stored in storage array 100A at a previous point in time) and generate fourth snapshot 232 (e.g., a snapshot of the data stored in storage array 100A at a more recent point in time). Using these two snapshots, storage array 100A may identify any changes made to the data that it stores. For example, storage array 100A may generate a diff-chunk map. The resulting diff-chunk map may be list of portions of the data stored in storage array 100A that have changed during the time between when third and fourth snapshots were created. In other words, the diff-chunk may be a representation of the portions of data that have been changed during this time period from the perspective of storage array 100A.

Once obtained, at interaction 228, the change list may be provided to data processing system 104A.

Data processing system 104A may use the change list to perform validation process 236. During validation process 236, data processing system 104A (e.g., more specifically an instance of the database application hosted by data processing system 104A) may identify data chunks stored in storage array 100A that are marked as having been changed based on the change list.

To do so, selective read requests may be sent to storage array 100A at operation 238. The read requests may be read for portions of fourth snapshot 232 corresponding to the data chunks marked as changed in the change list. In response, at operation 240, storage array 100A may provide the selection portions to data processing system 104A.

Once the requested portions have been received by data processing system 104A, data processing system 104A may use the integrity data (e.g., 114) for each received record (e.g., 110) to verify the integrity of the payload (e.g., 112) of each record. The specific verification algorithm used may depend on the type of integrity data available for use with each of the records.

Records that are unable to be verified (e.g., fail verification checks) may be treated, for example, as having been maliciously modified. Such records may be marked accordingly, and/or backups may be used to restore the records.

By only verifying the integrity of a portion of the records stored in storage array 100A, the computational cost may be reduced when compared to verifying the integrity of all of the records (e.g., at least those which will be used in a backup) thereby allowing addition computing resources to be dedicated to providing desired computer implemented services.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Figure 3A:
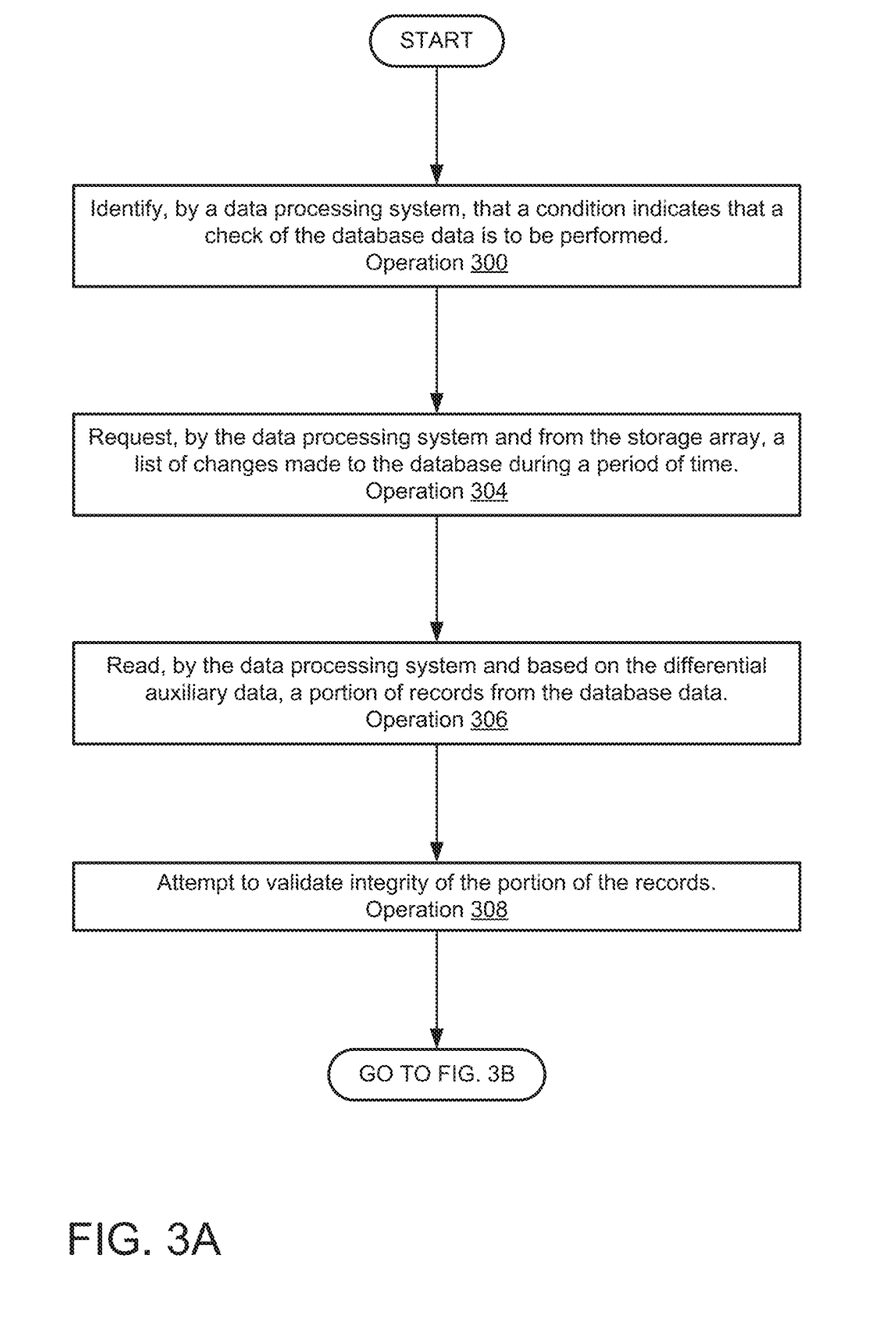
FIGS. 3A-3B show flow diagrams illustrating a method in accordance with an embodiment.
Figure 3B:
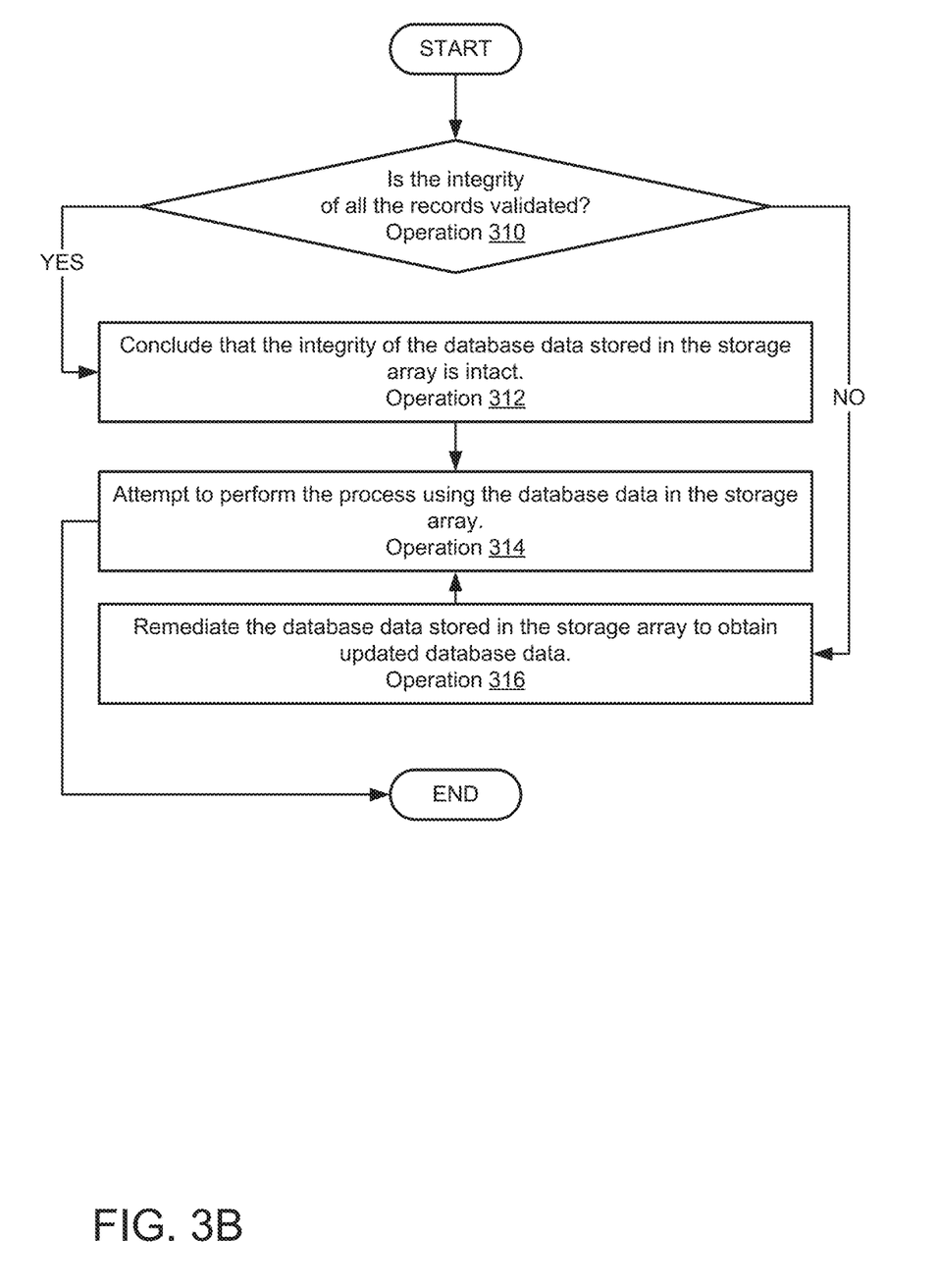

As discussed above, the components of FIGS. 1A-1C may perform various methods to manage data used by data processing systems. FIGS. 3A-3B illustrate a method that may be performed by the components of the system of FIGS. 1A-1C. In the diagram discussed below and shown in FIG. 3A-3B, any of the operations may be repeated, performed in different orders, and/or performed in parallel with or in a partially overlapping in time manner with other operations.

Turning to FIG. 3A, a flow diagram illustrating a method of managing data in accordance with an embodiment is shown. The method may be performed, for example, by any of the components of the system of FIGS. 1A-1C, and/or other components not shown therein.

At operation 300, a data processing system may identify that a condition indicates that a check of the database data is to be performed. The data processing system may identify that a check of the database data is to be performed by identifying that a backup for the database data is to be created.

At operation 304, a list of changes to stored data over a period of time may be requested by the data processing system and from the storage array. The list of changes may be requested by sending, from the data processing system and to the storage array, a message that requests a copy of the list of changes.

At operation 306, a portion of records, based on the list of changes, from the database data may be read by the data processing system. The portion of the records may be read by (i) sending read requests for a snapshot of the database data, and (ii) receiving the requested data in response to the requests.

At operation 308, integrity of the portion of the records may be attempted to be validated. The integrity of the portion of the records may be validated by using integrity data from the records. The algorithm used to perform the integrity validation may depend on the type of the integrity data.

For example, the integrity data of a record may include a first checksum, hash, and/or cryptographic string. A new copy of the integrity data may be generated. If the first checksum, the hash, and/or the cryptographic string can be matched to the new integrity data, then the integrity of the portion of the records may be validated. Otherwise, if the first checksum, the hash, and/or the cryptographic string cannot be matched to the new integrity data, then the record may be compromised.

Turning to FIG. 3B, a continuation of the flow diagram shown in FIG. 3A in accordance with an embodiment is shown.

At operation 310, a determination regarding whether the integrity of all of the records was successfully validated.

If the integrity all of the records is validated, then the method may proceed to operation 312. Otherwise, if the integrity of at least one record of the portion of the records is not validated, then the method may proceed to operation 316.

At operation 312, the integrity of the database data stored in the storage array may be concluded to be intact.

At operation 314, a process that uses the database data in the storage array may be attempted to be performed. The process may be, for example, a backup generation process. The snapshot used to identify the records that had changed may be used to generate the backup. The process may be other types of processes that use data stored in the storage array without departing from embodiments disclosed herein.

The method may end following operation 314.

Returning to operation 310, the method may proceed to operation 316 following operation 310 if the integrity of at least one record cannot be validated.

At operation 316, the database data stored in the storage array may be remediated to obtain updated database data. The database data stored in the storage array may be remediated by reverting at least a record of the portion of the records to a previous state. The record of the portion of the records may be reverted using a backup or other type of data (e.g., a previously generated snapshot).

The method may proceed to operation 314 following 316. Operation 314 may then be performed using the updated database data.

The method may end following operation 314.

Thus, using the methods shown in FIGS. 3A-3B, embodiment disclosed herein may reduce the likelihood of malicious activity depriving data processing systems of access to data by proactively identifying impacts (e.g., changed data) of such malicious activity.

Figure 4:
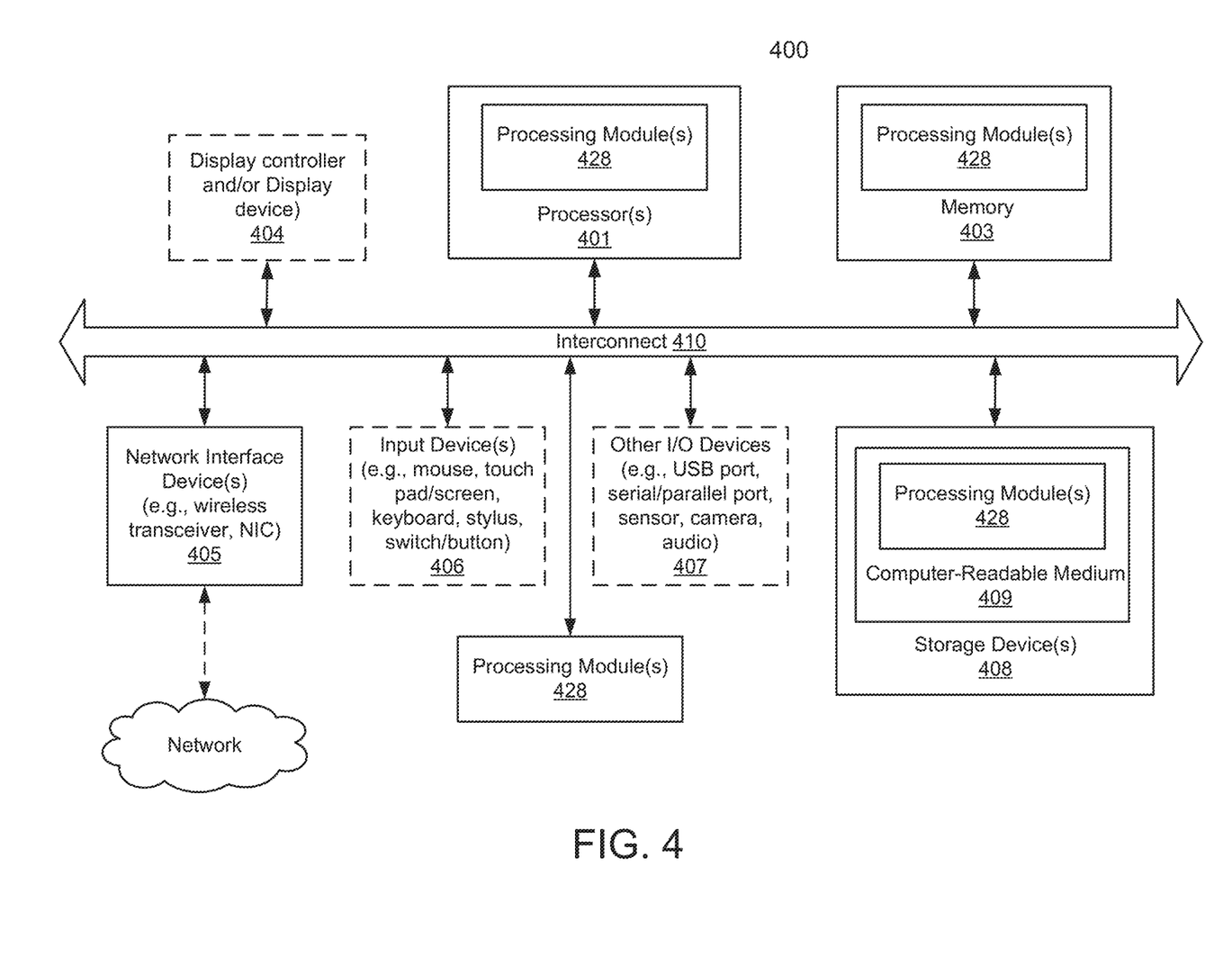
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing database data stored in a storage array and on behalf of a data processing system hosting a database application, the method comprising:
    identifying, by the data processing system, that a condition indicates that a check of the database data is to be performed;
    based on the condition being identified:
        requesting, by the data processing system and from the storage array, differential auxiliary data that lists changes made by the storage array to the database data during a period of time;
        reading, by the data processing system and based on the differential auxiliary data, a portion of records from the database data;
        attempting to validate integrity of the portion of the records;
        in a first instance of the attempting where integrity of at least one record of the portion of the records is not validated:
            remediating the database data stored in the storage array to obtain updated database data;
            attempting, using the updated database data, to perform a process on which the condition is based;
        in a second instance of the attempting where integrity of all records of the portion of the records is validated:
            concluding that the integrity of the database data stored in the storage array is intact; and
            performing the process using the database data in the storage array.

2. The method of claim 1, wherein the differential auxiliary data is generated by the storage array using two snapshots of the database data stored in the storage array, the two snapshots being taken by the storage array at different points in time and that delineate the period of time.

3. The method of claim 2, wherein the condition is an occurrence of a scheduled point in time for generation of a new backup of the database data.

4. The method of claim 3, wherein the period of the time is an interval of time between when a most recent backup for the database data was created and the scheduled point in time.

5. The method of claim 4, wherein the listed changes comprise identifiers of files that have been modified during the period of the time from a perspective of the storage array.

6. The method of claim 5, wherein each record of the portion of the records comprises at least portion of one of the files.

7. The method of claim 1, wherein attempting to validate the integrity of the portion of the records comprises:
    for a record of the portion of the records:
        obtaining a first checksum from integrity data of the record;
        obtaining a second checksum using a payload of the record and a checksum algorithm; and comparing the first checksum to the second checksum to ascertain whether a match has been made.

8. The method of claim 1, wherein a record of the records comprises:
   a payload comprising application data for the database application; and
   integrity data usable to validate integrity of the payload.

9. The method of claim 1, wherein remediating the database data stored in the storage array to obtain the updated database data comprises:
   reverting at least a record of the portion of the records to a previous state.

10. The method of claim 1, wherein attempting, using the updated database data, to perform a process on which the condition is based comprises:
   generating, using a first snapshot of the database data and a second snapshot of the database data in a previous state, changes to the database data that have been made during the period of time; and
   using the changes to the database to store data usable to perform restorations for the database data.

11. A non-transitory machine-readable medium having instructions stored therein, which when executed by a processor, cause the processor to perform operations for managing database data stored in a storage array and on behalf of a data processing system hosting a database application, the operations comprising:
   identifying, by the data processing system, that a condition indicates that a check of the database data is to be performed;
   based on the condition being identified:
      requesting, by the data processing system and from the storage array, differential auxiliary data that lists changes made by the storage array to the database data during a period of time;
      reading, by the data processing system and based on the differential auxiliary data, a portion of records from the database data;
      attempting to validate integrity of the portion of the records;
      in a first instance of the attempting where integrity of at least one record of the portion of the records is not validated:
         remediating the database data stored in the storage array to obtain updated database data;
         attempting, using the updated database data, to perform a process on which the condition is based;
      in a second instance of the attempting where integrity of all records of the portion of the records is validated:
         conclude that the integrity of the database data stored in the storage array is intact; and
         performing the process using the database data in the storage array.

12. The non-transitory machine-readable medium of claim 11, wherein the differential auxiliary data is based on two snapshots of the database data taken at different points in time and that delineate the period of time.

13. The non-transitory machine-readable medium of claim 12, wherein the condition is an occurrence of a scheduled point in time for generation of a new backup of the database data.

14. The non-transitory machine-readable medium of claim 13, wherein the period of the time is an interval of time between when a most recent backup for the database data was created and the scheduled point in time.

15. The non-transitory machine-readable medium of claim 14, wherein the listed changes comprise identifiers of files that have been modified during the period of the time from a perspective of the storage array.

16. A data processing system, comprising:
   a processor; and
   a memory coupled to the processor to store instructions, which when executed by the processor, cause the processor to perform operations for managing database data stored in a storage array and on behalf of the data processing system, the data processing system hosting a database application and the operations comprising:
      identifying, by the data processing system, that a condition indicates that a check of the database data is to be performed;
      based on the condition being identified:
         requesting, by the data processing system and from the storage array, differential auxiliary data that lists changes made by the storage array to the database data during a period of time;
         reading, by the data processing system and based on the differential auxiliary data, a portion of records from the database data;
         attempting to validate integrity of the portion of the records;
         in a first instance of the attempting where integrity of at least one record of the portion of the records is not validated:
            remediating the database data stored in the storage array to obtain updated database data;
            attempting, using the updated database data, to perform a process on which the condition is based;
         in a second instance of the attempting where integrity of all records of the portion of the records is validated:
            concluding that the integrity of the database data stored in the storage array is intact; and
            performing the process using the database data in the storage array.

17. The system of claim 16, wherein the differential auxiliary data is based on two snapshots of the database data taken at different points in time and that delineate the period of time.

18. The system of claim 17, wherein the condition is an occurrence of a scheduled point in time for generation of a new backup of the database data.

19. The system of claim 18, wherein the period of the time is an interval of time between when a most recent backup for the database data was created and the scheduled point in time.

20. The system of claim 19, wherein the listed changes comprise identifiers of files that have been modified during the period of the time from a perspective of the storage array.

\* \* \* \* \*